United States Patent
Shin

(10) Patent No.: US 11,482,896 B2
(45) Date of Patent: Oct. 25, 2022

(54) COMPRESSOR PROVIDED WITH A MOTOR

(71) Applicant: LG Electronics Inc., Seoul (KR)

(72) Inventor: Donggi Shin, Seoul (KR)

(73) Assignee: LG Electronics Inc., Seoul (KR)

( * ) Notice: Subject to any disclaimer, the term of this patent is extended or adjusted under 35 U.S.C. 154(b) by 352 days.

(21) Appl. No.: 16/775,943

(22) Filed: Jan. 29, 2020

(65) Prior Publication Data

US 2020/0244115 A1 Jul. 30, 2020

(30) Foreign Application Priority Data

Jan. 29, 2019 (KR) .................. 10-2019-0011403

(51) Int. Cl.
| | | |
|---|---|---|
| *H02K 1/22* | (2006.01) | |
| *F04B 35/04* | (2006.01) | |
| *H02K 5/22* | (2006.01) | |
| *H02K 3/38* | (2006.01) | |

(52) U.S. Cl.
CPC ............. *H02K 1/223* (2013.01); *F04B 35/04* (2013.01); *H02K 3/38* (2013.01); *H02K 5/22* (2013.01); *H02K 2201/09* (2013.01); *H02K 2203/12* (2013.01)

(58) Field of Classification Search
CPC ....... F04B 35/04; F04B 35/045; H02K 1/145; H02K 1/223; H02K 2201/03; H02K 2201/09; H02K 2203/12; H02K 2213/03; H02K 3/38; H02K 33/16; H02K 5/22; Y02E 50/10; Y02P 20/582
See application file for complete search history.

(56) References Cited

U.S. PATENT DOCUMENTS

| | | | | |
|---|---|---|---|---|
| 8,810,103 | B2* | 8/2014 | Liu ...................... | H02K 21/14 |
| | | | | 310/194 |
| 9,705,376 | B2* | 7/2017 | Fan ...................... | H02K 1/141 |
| 10,491,057 | B2* | 11/2019 | Seki ..................... | H02K 15/022 |
| 2013/0058811 | A1* | 3/2013 | Hong ................... | F04B 35/045 |
| | | | | 310/30 |
| 2013/0058816 | A1* | 3/2013 | Kim ..................... | F04B 35/045 |
| | | | | 417/437 |

FOREIGN PATENT DOCUMENTS

| | | |
|---|---|---|
| CN | 1221244 | 6/1999 |
| CN | 1276049 | 12/2000 |
| CN | 1770605 | 5/2006 |
| CN | 105281515 | 1/2016 |
| JP | 2000110718 | 4/2000 |
| JP | 2007068373 | 3/2007 |
| KR | 20020069588 | 9/2002 |
| KR | 10-0386270 | 6/2003 |
| KR | 20040105079 | 12/2004 |

(Continued)

OTHER PUBLICATIONS

Office Action in Chinese Appln. No. 202010078656.0, dated Nov. 29, 2021, 10 pages (with English translation).

(Continued)

*Primary Examiner* — Naishadh N Desai
(74) *Attorney, Agent, or Firm* — Fish & Richardson P.C.

(57) ABSTRACT

A compressor provided with a motor includes several core block assemblies aligned in the circumferential direction of a bobbin and the several core block assemblies have a V-shaped bending shape.

20 Claims, 21 Drawing Sheets

(56) References Cited

FOREIGN PATENT DOCUMENTS

KR          20160010984          1/2016
WO          WO-9943069 A1  *   8/1999    ............. H02K 33/18

OTHER PUBLICATIONS

Korean Notice of Allowance in Korean Application No. 10-2019-0011403, dated Jun. 24, 2020, 3 pages (with English translation).
Notice of Allowance in Chinese Appln. No. 202010078656.0, dated May 30, 2022.

* cited by examiner

COMPRESSOR PROVIDED WITH A MOTOR

CROSS REFERENCE TO RELATED APPLICATION

The present application claims priority to Korean Patent Application No. 10-2019-0011403, filed on Jan. 29, 2019, the entire contents of which is incorporated herein for all purposes by this reference.

BACKGROUND

Technical Field

The present disclosure relates to a compressor provided with a motor.

Description of the Related Art

A cooling system, which is a system that produces cold air by circulating a refrigerant, repeats compression, condensation, expansion, and evaporation of a refrigerant. To this end, the cooling system includes a compressor, a condenser, an expansion device, and an evaporator. The cooling system may be installed in a refrigerator or an air conditioner as a home appliance.

In general, a compressor, which is a mechanical apparatus that increases the pressure of air, a refrigerant, or other various working gases by compressing them using power from a power generator such as an electric motor or a turbine, is generally used for appliances or throughout industry.

Such a compressor, in a broad meaning, can be classified into a reciprocating compressor in which a compression space into or from which an operation gas is suctioned or discharged is formed between a piston and a cylinder and the piston compresses a refrigerant by linearly reciprocating in the cylinder, a rotary compressor in which a compression space into or from which an operation gas is suctioned or discharged is formed between a roller eccentrically rotating and a cylinder and a roller compresses a refrigerant by eccentrically rotating along the inner wall of the cylinder, and a scroll compressor in which a compression space into or from which an operation gas is suctioned or discharged is formed between an orbiting scroll and a fixed scroll and the orbiting scroll compresses a refrigerant by rotating along the fixed scroll.

Recently, especially, a compressor (hereafter, a linear compressor) that can improve compression efficiency with a simple structure without a mechanical loss due to conversion of motions by having a piston directly connected to a motor that generates a straight reciprocating motion has been developed as one of the reciprocating compressors.

In general, the linear compressor suctions, compresses, and then discharges a refrigerant by reciprocating straight a piston in a cylinder using a motor in a sealed shell.

The motor is configured such that a permanent magnet is positioned between an inner stator and an outer stator, and the permanent magnet is reciprocated straight by interactive electromagnetic force between the permanent magnet and the inner (or outer) stator. Further, the permanent magnet is operated while being connected to the piston, so the piston suctions, compresses, and then discharges a refrigerant by reciprocating straight in the cylinder.

In relation to a method of manufacturing a motor that is disposed in linear compressor in the related art, the applicant(s) has filed a patent application (hereafter, Prior Art Document 1), which was registered.

[Prior Art Document 1]

1. Registration No. 10-0386270, registration date: May 21, 2003, Title of invention: structure and method for laminating core or motor According to the method for laminating a core of a motor of [Prior Art Document 1], a caulking portion having a movement space hole (Mac Hole) is disposed in a lamination sheet and several lamination sheets are stacked, whereby a stacked structure is formed. Further, when the stacked structure is configured, the caulking portions of the lamination sheets can be fitted to each other. Further, a process of forming a curved portion on the stacked structure is performed through a pressing process, so the entire stacked structure has a cylindrical shape.

According to this laminating structure, the distance between a magnet and the inner surface of the stacked structure is uniform and a radial side force is applied to an actuator (including a piston) axially reciprocating by a reluctance force. The side force acts as a factor that decreases the operation efficiency of the compressor by increasing the air gap between the piston and the cylinder.

Further, when a Mac Hole is formed in the lamination sheet, the core area of the motor decreases and accordingly there is a problem it is required to make the lamination sheet relatively large by the size of the Mac Hole.

SUMMARY

The present disclosure has been proposed to solve the problems identified herein and an object is to provide a compressor provided with a motor, the compressor having a core block assembly having a bending shape.

Further, an object is to provide a compressor provided with a motor, the compressor being able to decrease a reluctance force that is generated between a magnet and an outer core by varying the distance between a magnet disposed in the motor and the inner surface of a core block in a circumferential direction.

Further, an object is to provide a compressor provided with a motor in which coupling grooves are formed in a sheet constituting a core block and are inclined with an acute angle in the radial direction when the sheets are stacked, thereby being able to a core block having a bending shape.

Further, an object is to provide a compressor provided with a motor in which a plurality of core blocks can be easily arranged circumferentially around a cylindrical bobbin because they have outer surfaces extending at an angle from a coupling surface.

Further, an object is to provide a compressor provided with a motor, the compressor being able to be easily manufactured and being able to sufficiently generate an electromagnetic force because a core block assembly is composed of four core blocks combined with each other and can have a V-shape and six core block assemblies constitute an outer core.

In order the achieve the objects, a compressor provided with a motor according to an embodiment of the present disclosure includes several core block assemblies aligned in the circumferential direction of a bobbin and the several core block assemblies have a V-shaped bending shape.

The inner parts of the core block assemblies face the outer circumferential surface of the magnet frame and form a vertical surface.

The distance between the vertical surface of the inner parts and the outer circumferential surface of the magnet frame circumferentially varies.

The outer parts of the core block assemblies are positioned outside the bobbin and form a vertical surface.

The inner parts and the outer parts of the core block assemblies have a V-shape.

In the core block assemblies, first and second core blocks are circumferentially combined and extend at an angle in a circumferential direction from a coupling surface.

The core block assemblies further include: a third core block coupled in an axial direction of the first core block; and a fourth core block coupled in an axial direction of the second core block.

When an extension line $\ell 3$ passing pass through a point P3 that meets the coupling surface of the inner part of the core block assemblies is defined, an angle made by the inner part and the third extension line $\ell 3$ is an acute angle.

When an extension line $\ell 4$ passing pass through a point P5 that meets the coupling surface of the outer part of the core block assemblies is defined, an angle made by the outer part and the extension line $\ell 4$ is an acute angle.

The first core block or the second core block includes several sheets circumferentially stacked.

The sheets have a coupling groove recessed from a surface of the sheets and a coupling portion protruding from another surface of the sheets.

A surface of the coupling groove and a surface of the coupling portion are shifted by a predetermined gap with respect to a circumferential direction.

Several sheets each having the shifted coupling groove and coupling portion are stacked, thereby configuring a stacked body arranged at an angle with respect to the circumferential direction.

The stacked body forms the first core block or the second core block.

The first and second core blocks have a symmetric shape with the coupling surface therebetween.

The present disclosure has been proposed to solve the problems and an object is to provide a compressor provided with a motor, the compressor having a core block assembly having a curved shape.

Further, an object is to provide a compressor provided with a motor, the compressor being able to decrease a reluctance force that is generated between a magnet and an outer core by varying the distance between a magnet disposed in the motor and the inner surface of a core block in a circumferential direction.

Further, an object is to provide a compressor provided with a motor in which coupling grooves are formed in a sheet constituting a core block and are inclined with an acute angle in the radial direction when the sheets are stacked, thereby being able to a core block having a bending shape.

Further, an object is to provide a compressor provided with a motor in which a plurality of core blocks can be easily arranged circumferentially around a cylindrical bobbin because they have outer surfaces extending at an angle from a coupling surface.

Further, an object is to provide a compressor provided with a motor, the compressor being able to be easily manufactured and being able to sufficiently generate an electromagnetic force because a core block assembly is composed of four core blocks combined with each other and can have a V-shape and six core block assemblies constitute an outer core.

Particular embodiments described herein include a compressor including a cylindrical bobbin, a coil, a magnet frame, an inner core, and an outer core. The coil may be disposed on an outer circumferential surface of the bobbin. The magnet frame may be at least partially surrounded by the coil and configured to mount a magnet. The inner core may be at least partially surrounded by the magnet frame. The outer core may include a plurality of core block assemblies. At least a portion of the outer core may be arranged at least partially around the bobbin. Each of the plurality of core block assemblies may include a first core block and a second core block circumferentially arranged relative to the first core block and coupled to the first core block at a coupling interface between the first core block and the second core block. Each of the plurality of core block assemblies may include an inner surface facing a central axis of the bobbin and an outer surface radially opposite to the inner surface. At least one of the inner surface or the outer surface including a first surface linearly extending in a first circumferential direction at a first angle relative to the coupling interface, and a second surface linearly extending in a second circumferential direction at a second angle relative to the coupling interface. The second circumferential direction may be opposite to the first circumferential direction.

In some implementations, the system can optionally include one or more of the following features. The first core block and the second core block may be circumferentially coupled at the coupling interface. Each of the core block assemblies may include a third core block axially coupled to the first core block, and a fourth core block axially coupled to the second core block. Each of the core block assemblies may include first, second, third, and fourth coupling interfaces. The first coupling interface may define a first boundary of the first and second core blocks. The first coupling interface may be the coupling interface. The second coupling interface may define a second boundary of the first and third core blocks. The third coupling interface may define a third boundary of the third and fourth core blocks. The fourth coupling interface may define a fourth boundary of the second and four core blocks. The first coupling interface may be axially aligned with the third coupling interface, and the second coupling interface may be circumferentially aligned with the fourth coupling interface. The first and third coupling interfaces may extend across the second and fourth coupling interfaces. The inner surface of each of the plurality of core block assemblies may be configured to be disposed inside the bobbin, and the outer surface of each of the plurality of core block assemblies may be configured to be disposed outside the bobbin. At least one of the inner surface or the outer surface may be configured to be in a V-shape. A third angle between the inner surface and a first reference line may range from greater than 0° to less than 90°. The first reference line may extend perpendicular to the first coupling interface or the third coupling interface and through a first reference point that lies on the first coupling interface or the third coupling interface. The third angle may include at least one of the first angle or the second angle. A fourth angle between the outer surface and a second reference line may range from greater than 0° to less than 90°. The second reference line may extend perpendicular to the first coupling interface or the third coupling interface and through a second reference point that lies on the first coupling interface or the third coupling interface. The fourth angle may include at least one of the first angle or the second angle. The inner surface of each of the plurality of core block assemblies may be configured to be spaced apart from the magnet frame with varying distances in a circumferential direction. A first point of the inner surface and a second point of the magnet frame may be defined such that a third reference line connecting the first point and the second point passes through the magnet and extends perpendicular to the magnet frame. A first distance between the first point and the second point may be a shortest distance between the inner surface and the magnet frame. A third point of the inner surface and a fourth point of the magnet frame may be defined such that a fourth reference line connecting the third point and the fourth point passes through a space between adjacent magnets and extends perpendicular to the magnet frame. A second distance between the third point and the fourth point may be a longest distance between the inner surface and the magnet frame. The first core block and the second core block may include a plurality of sheets circumferentially stacked. Each of the plurality of sheets may include a first sheet portion providing the outer surface, a second sheet portion connected to the first sheet portion, and a third sheet portion connected to the second sheet portion and providing the inner surface. At least one of the first, second, or third sheet portions may include a coupling groove recessed from a first surface of the sheet, and a coupling portion protruding from a second surface of the sheet opposite to the first surface of the sheet. The coupling groove and the coupling portion may be offset by a predetermined gap along a circumferential direction. The coupling portion of a sheet may be configured to be engaged with the coupling recess of an adjacent sheet such that, when stacked, the plurality of sheets is arranged at an angle along the circumferential direction. At least one of the first core block or the second core block may include the plurality of sheets being stacked. The first core block may be configured symmetrically to the second core block with the coupling interface therebetween. The coupling groove of the first core block may be configured to face the coupling groove of the second core block. Each of the plurality of core block assemblies may include a groove portion recessed at a center portion of the coupling interface. The groove portion may include the coupling groove of the first core block and the coupling groove of the second core block.

Particular embodiments described herein include a compressor including a bobbin on which a coil is wound, a magnet frame, an inner core, and an outer core. The magnet frame may be at least partially surrounded by the coil and configured to mount a magnet. The inner core may be at least partially surrounded by the magnet frame. The outer core may include first and second core blocks circumferentially coupled. At least a portion of the outer core may be arranged at least partially around the bobbin. The first core block and the second core block each may include sheets circumferentially stacked. The sheets may each include a first sheet portion providing an outer part of the first and second core blocks, a second sheet portion connected to the first sheet portion, and a third sheet portion connected to the second sheet portion and providing an inner part of the first and second core blocks.

In some implementations, the system can optionally include one or more of the following features. The outer core may include a third core block axially coupled to the first core block, and a fourth core block axially coupled to the second core block.

DETAILED DESCRIPTION

Hereinafter, detailed embodiments of the present disclosure will be described with reference to the drawings. However, the spirit of the present disclosure is not limited to the proposed embodiments and other embodiments may be easily proposed by those skilled in the art without departing from the scope of the present disclosure.

Figure 1:
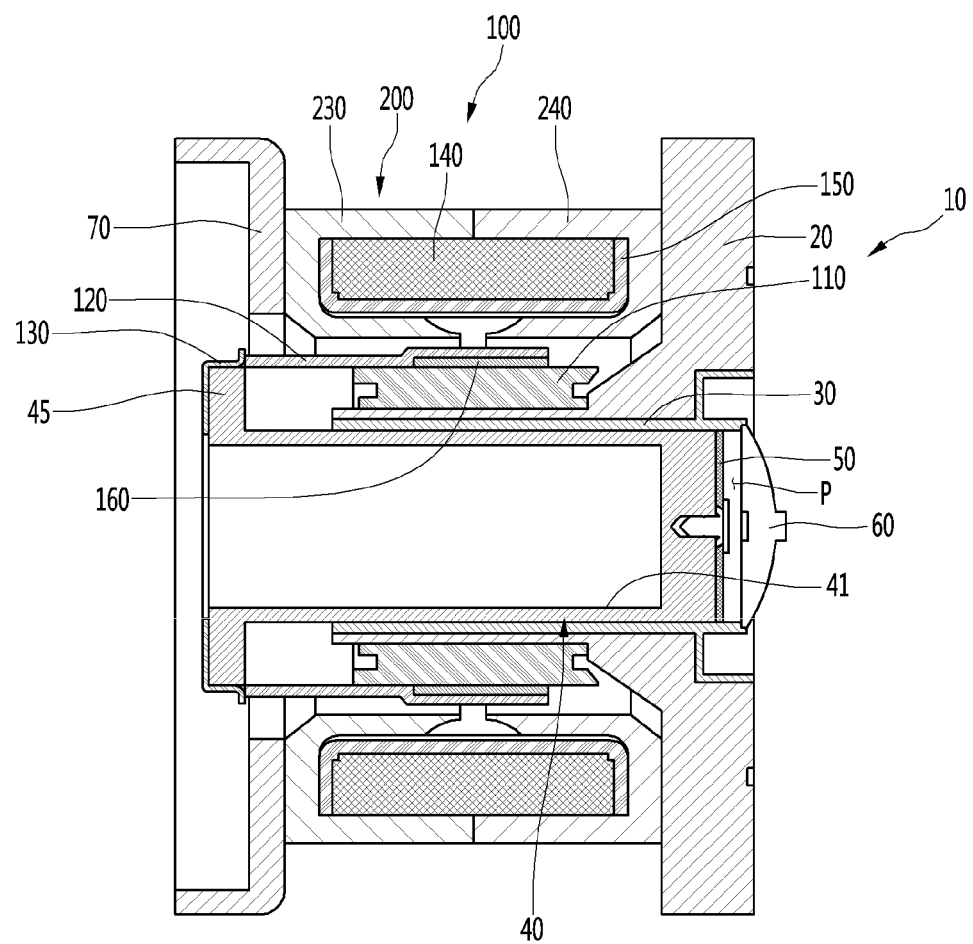
FIG. 1 is a cross-sectional view showing a partial configuration of a compressor according to an embodiment of the present disclosure.
Figure 2:
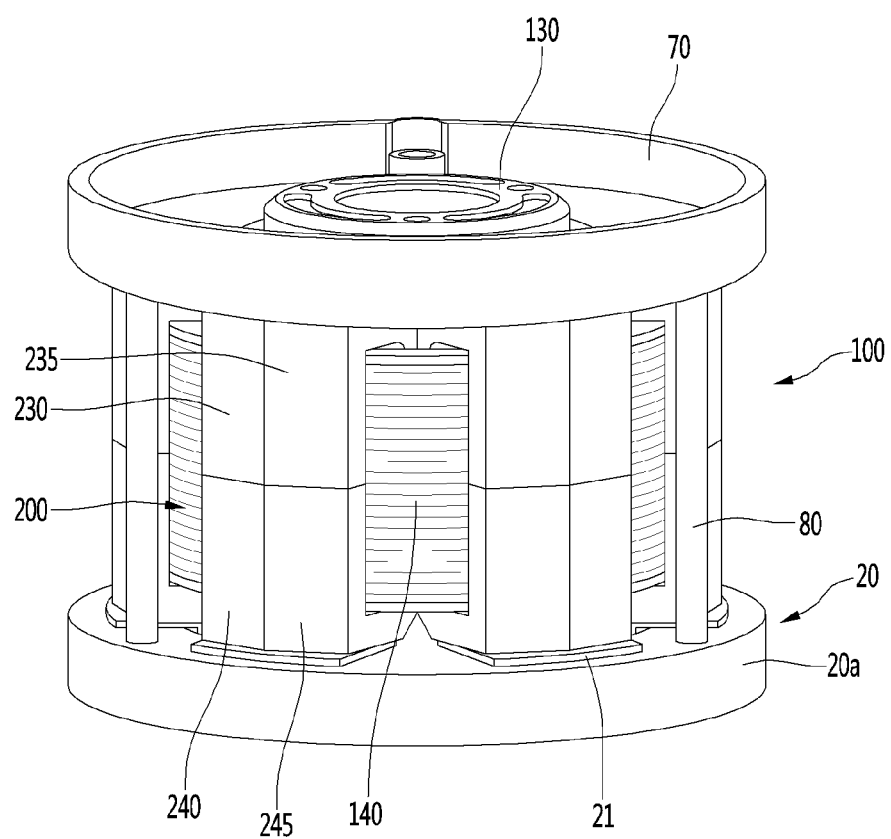
FIG. 2 is a perspective view showing an assembly configuration of a motor, a stator cover, and a frame according to an embodiment of the present disclosure.
Figure 3:
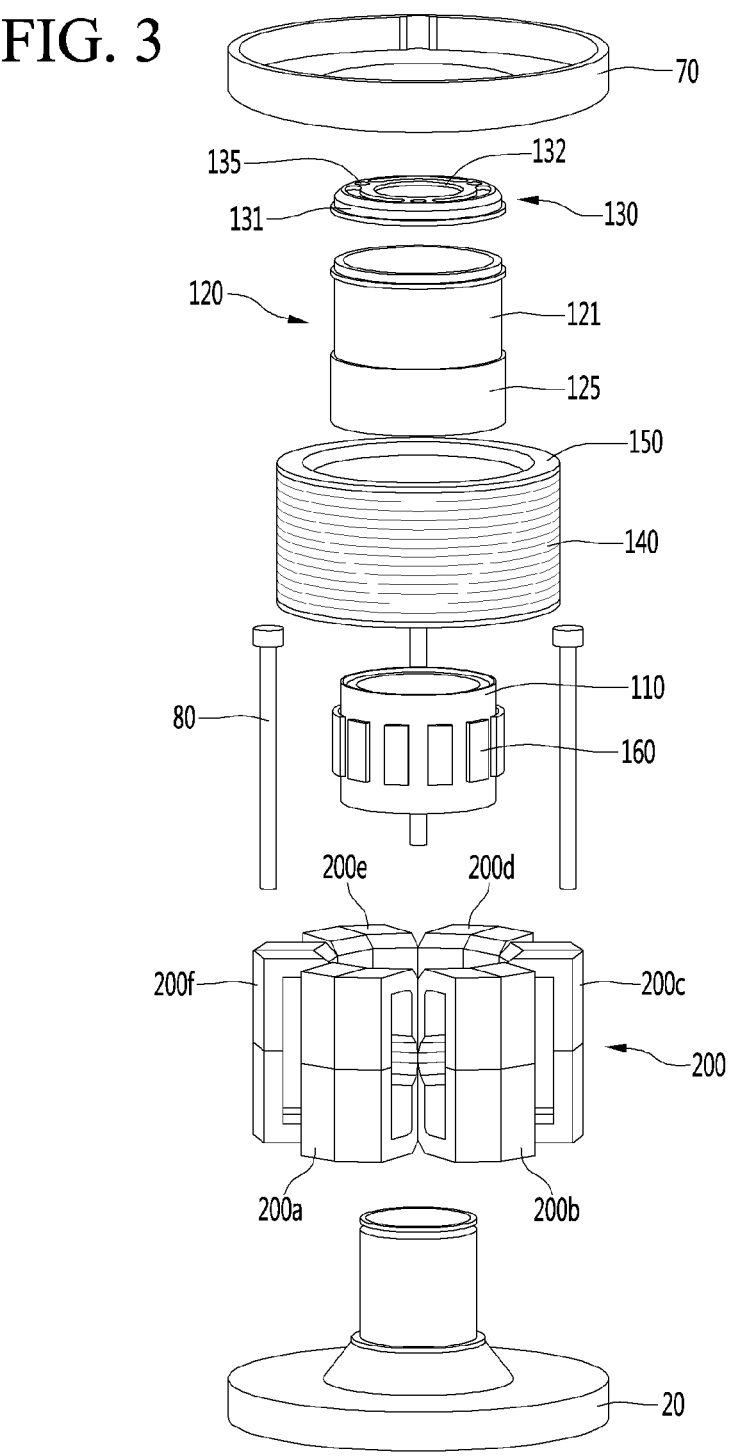
FIG. 3 is an exploded perspective view of the assembly of FIG. 2.

FIG. 1 is a cross-sectional view showing a partial configuration of a compressor according to an embodiment of the present disclosure, FIG. 2 is a perspective view showing an assembly configuration of a motor, a stator cover, and a frame according to an embodiment of the present disclosure, and FIG. 3 is an exploded perspective view of the assembly of FIG. 2.

Referring to FIGS. 1 to 3, a compressor 10 according to an embodiment of the present disclosure includes a cylinder 30 forming a compression space P, a piston 40 linearly reciprocating in the cylinder 30, and a motor 100 applying a driving force to the piston 40. When the motor 100 is operated, the piston 40 can be axially reciprocated.

Directions are defined.

The term "axial direction" may be understood as the reciprocation direction of the piston 40, that is, the left-right direction in FIG. 1. Further, in the "axial direction", the direction from the compression space P to a discharge valve 60 can be defined as "forward" and the opposite direction can be defined as "rearward". Meanwhile, the term "radial direction", which is the direction perpendicular to the reciprocation direction of the piston 40, may be understood as the vertical direction in FIG. 1.

The compressor 10 further includes a frame 20. The frame 20 is understood as a component for fixing the cylinder 30. The frame 20 is disposed to surround the cylinder 30. That is, the cylinder 30 may be disposed inside the frame 20.

For example, the cylinder 30 may be forcibly fitted inside the frame 20. The cylinder 30 and the frame 20 may be made of aluminum or an aluminum alloy.

The motor 100 includes an outer core (including 145, 150, 200) fixed to the frame 20 and disposed to surround the cylinder 30, an inner core 110 spaced inward apart from the outer core, and a magnet 160 positioned in the space between the outer core and the inner core 110. The inner core 110 may be inserted inside the outer core.

The magnet 160 can be reciprocated straight by a mutual electromagnetic force with the outer core and the inner core 110. The magnet 160 may be a single magnet having one pole or may be formed by combining several magnets having three poles.

The magnet 160 may be disposed on a magnet frame 120. The magnet frame 138 may have a substantially cylindrical shape and the outer circumferential portion of the magnet frame 120 may be inserted in the space between the outer core and the inner core 110.

In detail, the magnet frame 120 includes a frame body 121 being open at the front end and the rear end and having a cylindrical shape, and a magnet support 125 disposed ahead of the frame body 121 and supporting the magnet 160. The magnet 160 may be attached to the inner surface of the magnet support 125. Further, the outer diameter of the magnet support 125 may be larger than the outer diameter of the frame body 121.

A top plate 130 may be coupled to the magnet frame 120. The top plate 130 has a ring shape and may be coupled to the rear portion of the magnet frame 120. Further, the outer circumferential portion of the magnet frame 120 may extend forward from the top plate 130.

In detail, the top plate 130 includes a ring-shaped plate body 131. An opening 132 is formed inside the plate body 131. The top plate 130 has a fastening hole 135 formed at the plate body 131. A screw is tightened in the fastening hole 135 and can be fastened to a piston flange 45.

The piston 40 is coupled to the top plate 130. In detail, the piston 40 includes a substantially cylindrical piston body 41 and a piston flange 45 extending radially outward from the rear portion of the piston body 41. The top plate 130 may be coupled to the piston flange 45.

The piston body 41 can reciprocate in the cylinder 30 and the piston flange 45 can reciprocate outside the cylinder 30.

Further, a suction valve 50 is installed at the front end of the piston body 41 and the compression space P is formed ahead of the suction valve 50. Further, a discharge valve 60 for discharging a refrigerant compressed in the compression space P may be installed ahead of the compression space P. The discharge valve 60 may be in contact with the front end of the cylinder 30.

The magnets 160 may be installed on an inner circumferential surface of the front portion of the magnet frame 120. Further, the magnet 160 may be disposed to face the outer circumferential surface of the inner core 110. In other words, the magnet 160 may be disposed between the outer circumferential surface of the inner core 110 and the inner circumferential surface of the magnet frame 120.

When the magnet 160 reciprocates, the piston 40 can axially reciprocate with the magnet 160.

The outer core (including 140,150,200) includes a coil assembly 140, 150 and a core body 200. The coil assembly 140, 150 includes a bobbin 150 and a coil 140 circumferentially wound on the outer circumferential surface of the bobbin 150.

The core body 200 includes a several core block assemblies circumferentially arranged and surrounding at least a portion of the coil assembly 140, 150. At least a portion of the several core block assembly may be positioned inside the bobbin 150 and the other portion may be positioned outside the bobbin 150.

For example, the several core block assemblies may be composed of six core block assemblies. In detail, the several core block assemblies may include a first assembly 200a, a second assembly 200b, a third assembly 200c, a fourth assembly 200d, a fifth assembly 2003, and a sixth assembly 200f.

Side ends of the first to sixth assemblies 200a~200f may be configured to be in contact with each other. Further, the first to sixth assemblies 200a~200f may have the same configuration (see FIG. 7).

A core groove 248 through which the bobbin 150 and the coil 140 pass is formed in each of the first to sixth assemblies 200a~200f. The core groove 248 is positioned inside a first part 201 and outside a third part 203. Accordingly, the first part 201 may be positioned outside the bobbin 150 and the coil 140 and the third part 203 may be positioned inside the bobbin 150 and the coil 140 with the core groove 248 therebetween.

The core block assemblies each include several core blocks 230, 235, 240, and 245. The several core blocks 230, 235, 240, and 245 include a first core block 230, a second core block 235 coupled to a circumferential side of the first core block 230, a third core block 240 coupled to an axial side of the first core block 230, and a fourth core block 245 coupled to a circumferential side of the third core block 240.

The first and second core blocks 230 and 235 may be configured to have a shape being in both circumferential direction with a coupling surface therebetween. Similarly, the third and fourth core blocks 240 and 245 may be configured to have a shape being in both circumferential direction with a coupling surface therebetween.

Figure 8:
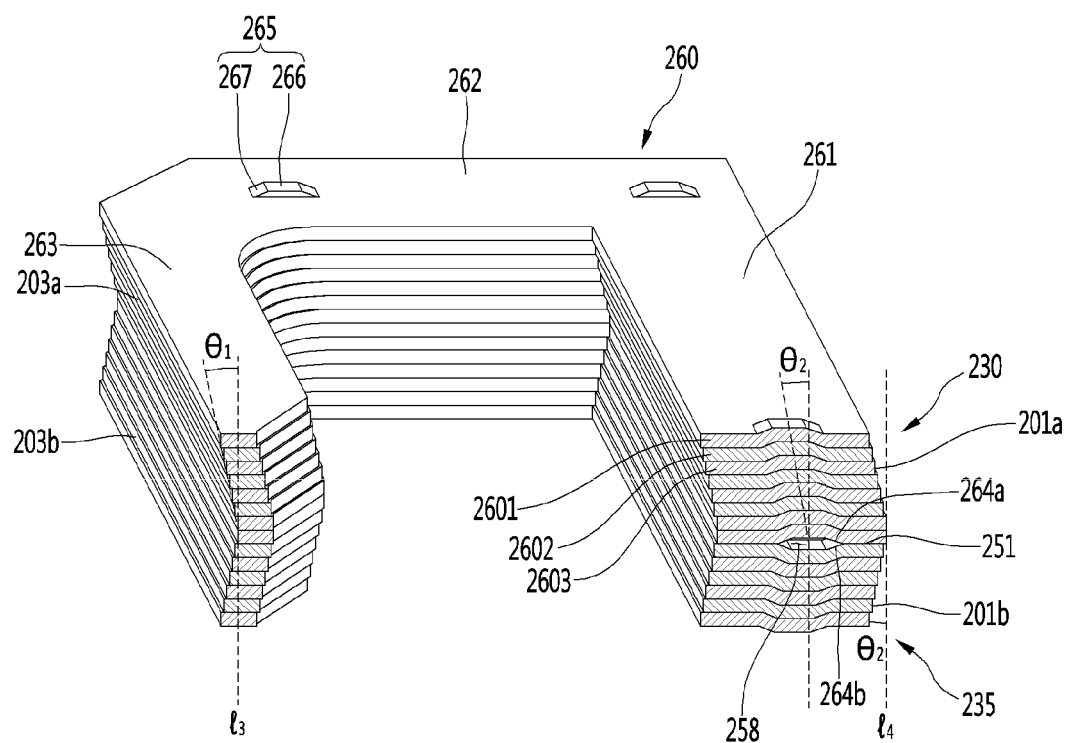
FIG. 8 is a perspective view showing a stacked body of sheets constituting first and second core blocks according to an embodiment of the present disclosure.

The first to fourth core blocks 230, 235, 240, and 245 each may be formed by circumferentially stacking plate-shaped thin sheets 260 (see FIG. 8).

A stator cover 70 is provided at a side of the outer core. In the outer core, a side may be supported by the frame 20 and the other side may be supported by the stator cover 70. In other words, the outer core may be disposed between the frame 20 and the stator cover 70.

The core block assembly may be supported by the frame 20. The frame 20 has a ring-shaped frame body 20a and a seat 21 in which ends of the third and fourth core blocks 240 and 245 are supported. The seat 21 protrudes from the frame body 20a and may be provided as several pieces circumferentially spaced. The number of the seats 21 may correspond to the number of the core block assemblies.

The linear compressor 10 further includes cover fasteners 80 for fastening the stator cover 149 and the frame 20. The cover fasteners 80 may extend forward toward the frame 20 through the stator cover 70 and may be coupled to the fastening holes of the frame 20.

Figure 4:
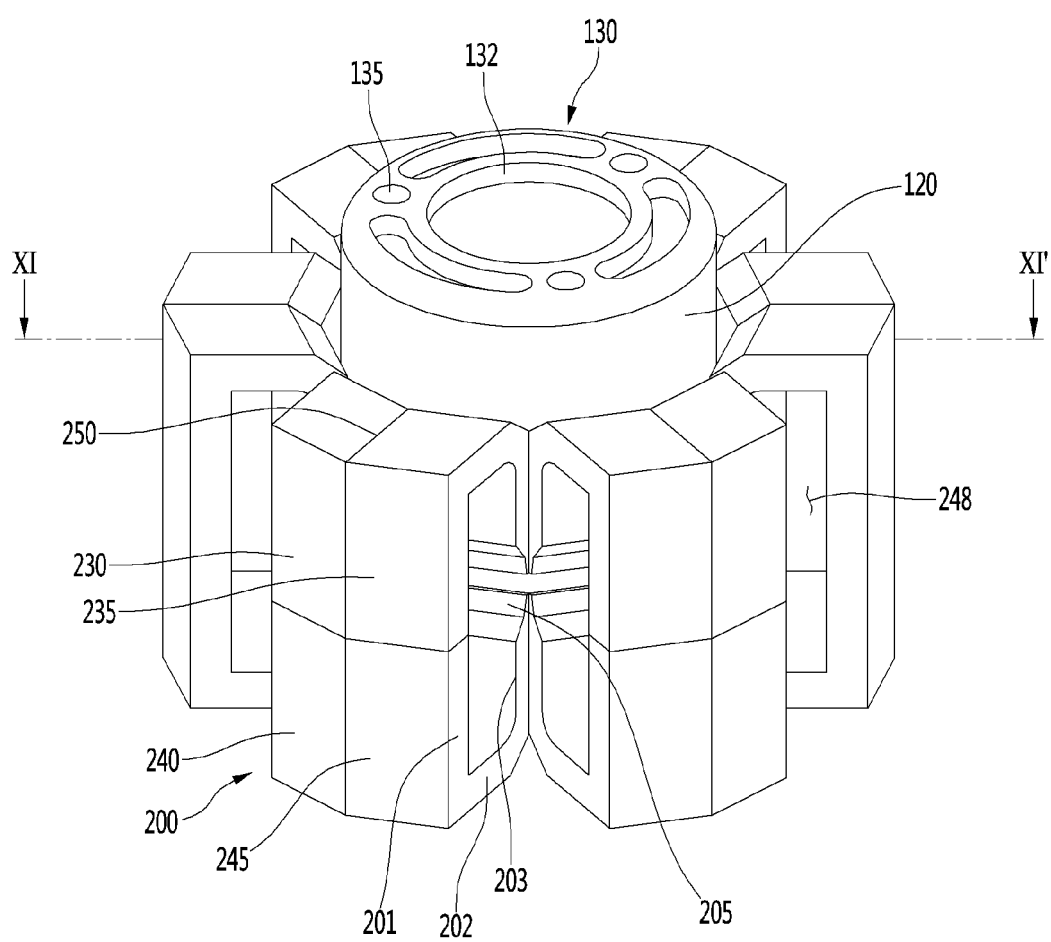
FIG. 4 is a perspective view showing a combination state of a motor and a magnet frame according to an embodiment of the present disclosure.
Figure 5:
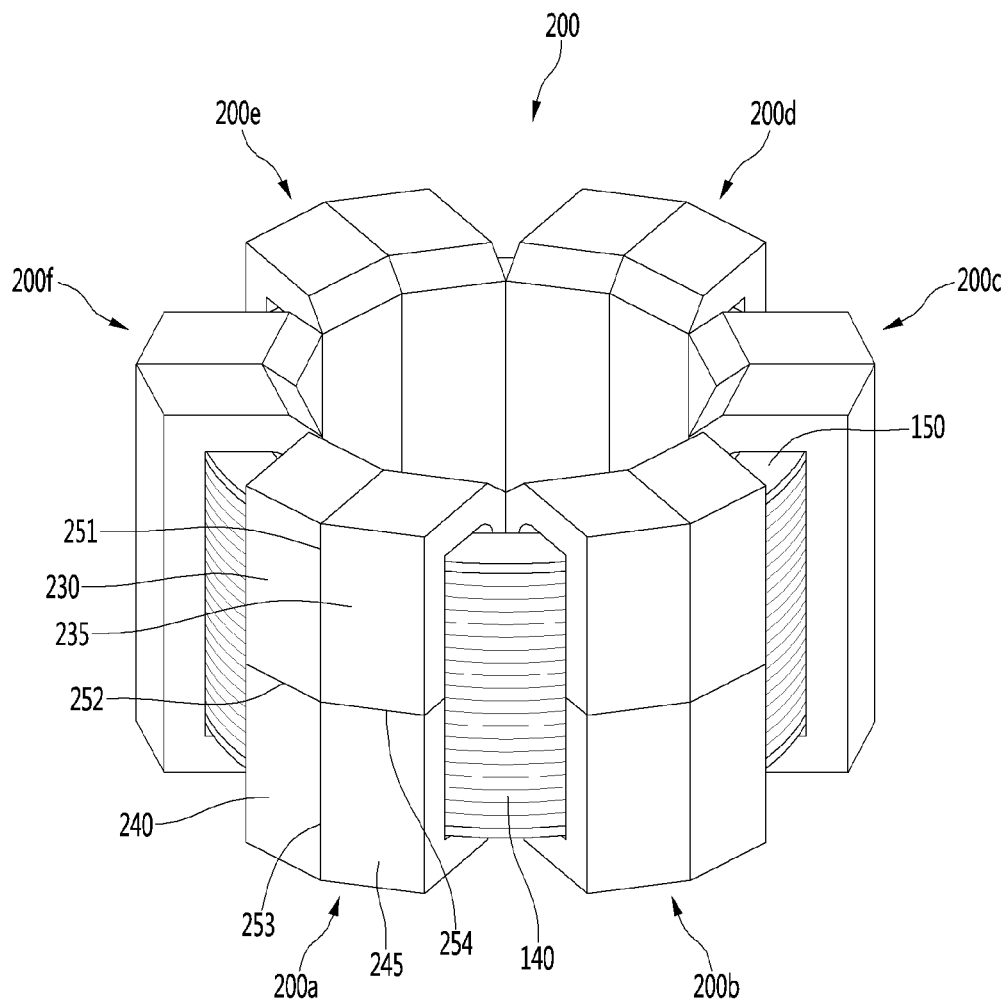
FIG. 5 is a perspective view showing the configuration of a motor according to an embodiment of the present disclosure.
Figure 6:
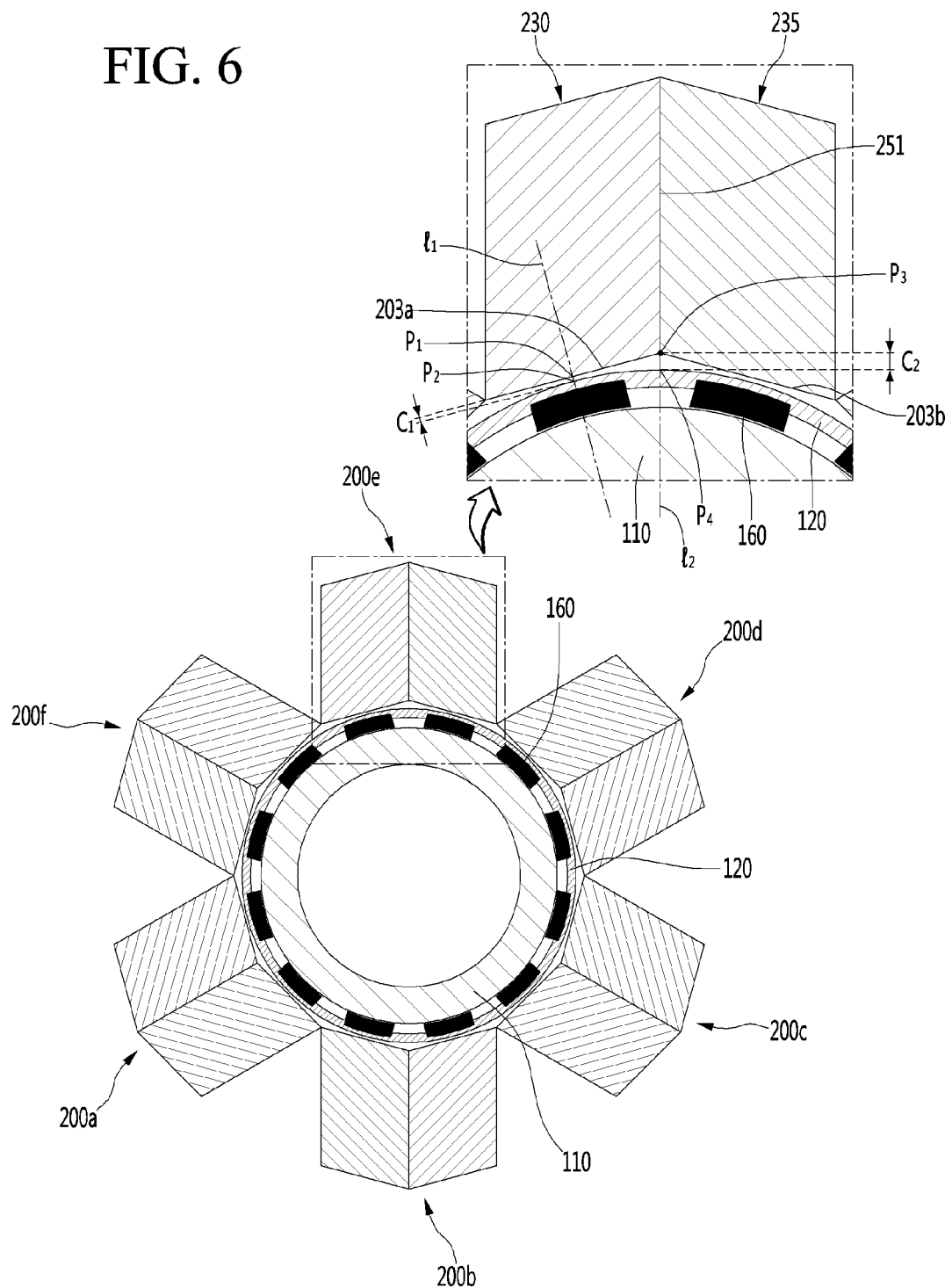
FIG. 6 is a cross-sectional view taken along line VI-VI' of FIG. 4.
Figure 7:
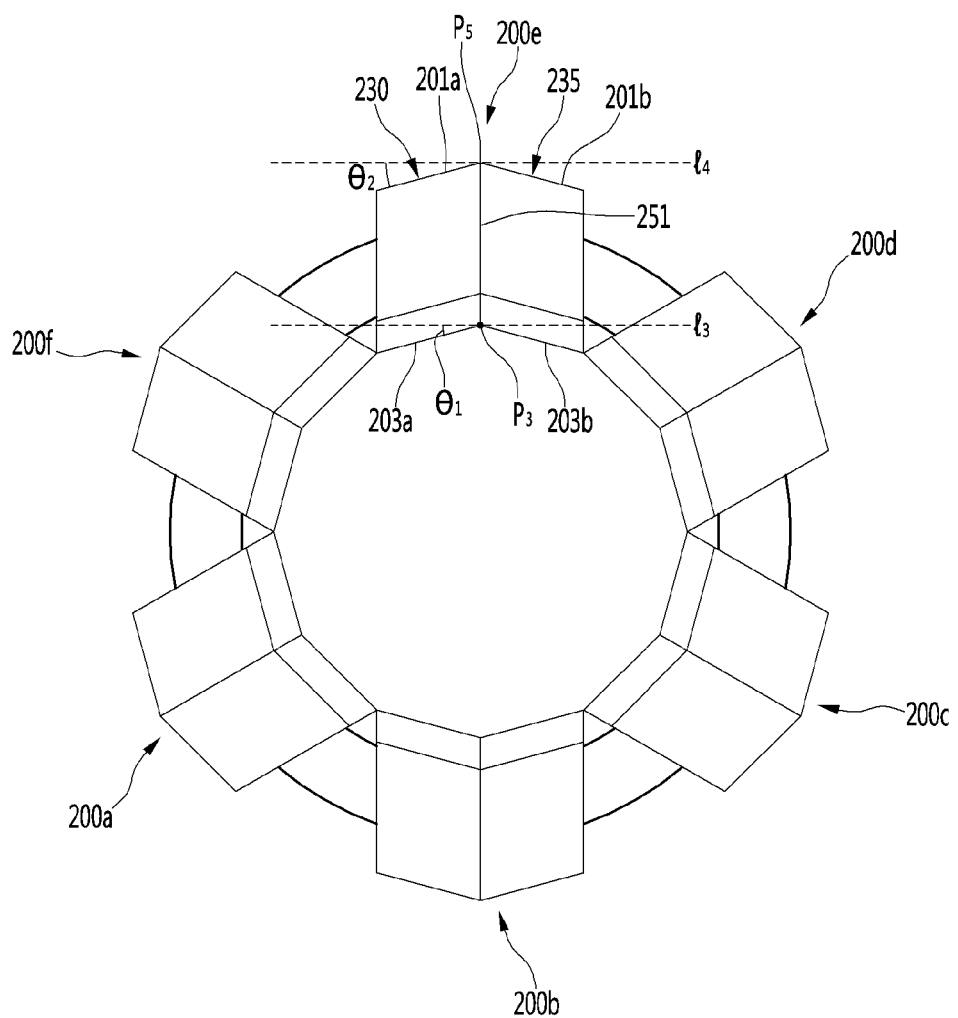
FIG. 7 is a plan view showing a combination state of an outer core and a bobbin according to an embodiment of the present disclosure.

FIG. 4 is a perspective view showing a combination state of a motor and a magnet frame according to an embodiment of the present disclosure, FIG. 5 is a perspective view showing the configuration of a motor according to an embodiment of the present disclosure, FIG. 6 is a cross-sectional view taken along line VI-VI' of FIG. 4, and FIG. 7 is a plan view showing a combination state of an outer core and a bobbin according to an embodiment of the present disclosure.

Referring to FIGS. 4 to 7, the motor 100 according to an embodiment of the present disclosure includes a core body 200 composed of several core block assemblies. The core block assemblies are each configured by combining four core blocks 230, 235, 240, and 245. For example, the four core blocks 230, 235, 240, and 245 may be combined by bonding or welding.

The coupling surfaces of the four core blocks 230, 235, 240, and 245 form a coupling surface 250. In detail, the block boundary surface 250 includes a first coupling surface 251 forming a boundary of the first and second core blocks 230 and 235, a second coupling surface 252 forming a boundary of the first and third core blocks 230 and 240, a third coupling surface 253 forming a boundary of the third and fourth core blocks 240 and 245, and a fourth coupling surface 254 forming a boundary of the second and four core blocks 235 and 245.

The first and third coupling surfaces 251 and 253 may be axially aligned and the second and fourth coupling surfaces 252 and 254 may be circumferentially aligned. Further, the first to fourth coupling surfaces 252, 252, 253, and 254 may be arranged to cross each other in a cross shape.

The outer part of the core block assembly may be disposed outside the coil 140 and the inner part of the core block assembly may be disposed inside the coil 140. Further, the outer part and the inner part of the core block assembly may be configured to have a bending shape.

For example, the outer part and the inner part of the core block assembly extend in both circumferential directions from the first and third coupling surfaces 251 and 253 and may be configured to bend at a set angle.

The core block assembly may be configured to have a shape entirely bending several times. In detail, the core block assembly has the first part 201 disposed radially outside the coil 140 and blocking at least a portion of the coil 140. The first part 201 may axially extend. Further, the outer surface of the first part 201 forms the bending outer part of the core block assembly.

The core block assembly further has two second part 202 disposed at the front portion and the rear portion of the bobbin 150. The second part 202 may be configured to extend vertically at both sides of the first part 201. The core block assembly may have a bending shape by the first and second parts 201 and 202, and the first and second parts 201 and 202 may be configured to have an entirely ⊏-shape.

The core block assembly further has two third parts 203 axially extending from the second part 202 and disposed radially inside the coil 140. The third part 203 may be configured to extend vertically at both sides of the second part 202. Further, the outer surface of the third part 203 forms the bending inner part of the core block assembly.

The core block assembly may have a bending shape by the second and third parts 202 and 203, and the second and third parts 202 and 203 may be configured to have an entirely ▫-shape with an open end.

The core block assembly further includes a pole 205 extending from the third part 203. The pole 205 may be configured to have a cross-sectional area and pointed end in comparison to the first to third parts 201, 202, and 203.

The third part 203 and the pole 205 of a core block assembly may be configured to be in contact with the third part 203 and the pole 205, respectively, of an adjacent core block assembly.

Referring to FIG. 6, the core body 200 composed of several core block assemblies may be disposed to surround the magnet frame 120. The several core block assemblies 200a~200f are circumferentially arranged, and the third parts 203 of the core block assemblies 200a~200f may be configured to be connected to each other.

Several magnets 160 may be installed on the inner circumferential surface of the magnet frame 120. The several magnets 160 may be circumferentially spaced and arranged. Further, the spaced distances of the several magnets 160 may be the same. For example, the several magnets 160 may include twelve magnets 160.

The first and second core blocks 230 and 235 of each of the core block assemblies are configured to have a bending shape with respect to the first coupling surface 251. Similarly, the third and fourth core blocks 240 and 245 are configured to have a bending shape with respect to the third coupling surface 253.

Further, the spaced distance a third part 203a forming the inner side of the first core block 230 or the third core block 240 and the outer circumferential surface of the magnet frame 120 is not uniform.

In detail, the third part 203a forms a vertical surface and the magnet frame 120 has an outer circumferential surface cylindrically extending, so a point P1 of the third part 203a and a point P2 of the magnet frame 120 that form the shortest distance C1 between the third part 203a and the outer circumferential surface of the magnet frame 120 can be defined.

Further, when a first extension line $\ell 1$ connecting the point P1 of the third part 203a and the point P2 of the magnet frame 120 is defined, the first extension line $\ell 1$ may be configured to pass through the magnet 160.

Meanwhile, another point P3 of the third part 203a and another point P4 of the magnet frame 120 that define the longest distance C2 between the third part 203a and the outer circumferential surface of the magnet frame 120 may be defined.

Further, when a second extension line $\ell 2$ connecting the point P3 of the third part 203a and the point P4 of the magnet frame 120 is defined, the second extension line $\ell 2$ may be configured not to pass through the magnet 160. That is, the second extension line $\ell 2$ may pass through a space between two spaced magnets 160.

Further, the second extension line $\ell 2$ may be configured to extend along the first coupling surface 251 or the third coupling surface 253.

According to this configuration, an electromagnetic force is easily induced by making the gap between the magnet 160 and the core block assembly relatively small, so deterioration of the efficiency of the motor can be prevented. Further, even if the gap is formed relatively large in the spaced spaces between several magnets 160, it doe not largely influence the piston 40 axially reciprocating and generation of a side force can be reduced.

Referring to FIG. 7, the first part forming the outer part of the core block assembly and the third part forming the inner part are configured to bend in both side directions from the first coupling surface 251 or the third coupling surface 253 radially extending.

When a third extension line $\ell 3$ passing through a point P3 meeting the first coupling surface 251 or the third coupling surface 253 of the inner part of the core block assembly is defined, the angle made by the inner part and the third extension line $\ell 3$ forms a first set angle θ1. The third extension line $\ell 3$ may be understood as a line extending perpendicular to the first coupling surface 251 or the third coupling surface 253.

In detail, the angle made by the third part 203a of the first core block 230 forming the inner part of the core block assembly and the third extension line $\ell 3$ forms the first set angle θ1. Further, the angle made by the third part 203b of the second core block 235 forming the inner part of the core block assembly and the third extension line $\ell 3$ forms the first set angle θ1.

For example, the first set angle θ1 may have a value larger than 0° and smaller than 90°.

When a fourth extension line $\ell 4$ passing through a point P5 meeting the first coupling surface 251 or the third coupling surface 253 of the outer part of the core block assembly is defined, the angle made by the outer part and the fourth extension line $\ell 4$ forms a second set angle θ2. The fourth extension line $\ell 4$ may be understood as a line extending perpendicular to the first coupling surface 251 or the third coupling surface 253.

In detail, the angle made by the first part 201a of the first core block 230 forming the outer part of the core block assembly and the fourth extension line $\ell 4$ forms the second set angle θ2. Further, the angle made by the first part 201b of the second core block 235 forming the outer part of the core block assembly and the fourth extension line $\ell 4$ forms the second set angle θ2.

For example, the second set angle θ2 may have a value larger than 0° and smaller than 90°. Further, the second set angle θ2 may be the same as the first set angle θ1.

Figure 9:
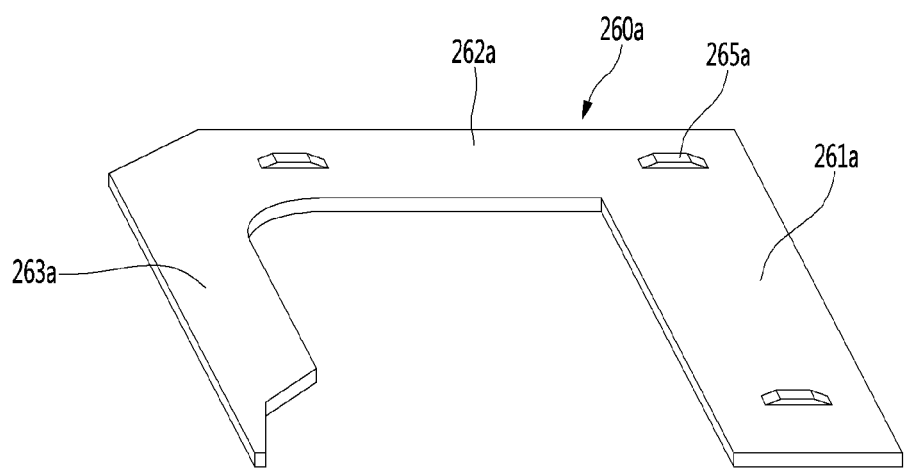
FIG. 9 is a perspective view showing the configuration of a first sheet according to an embodiment of the present disclosure.
Figure 10:
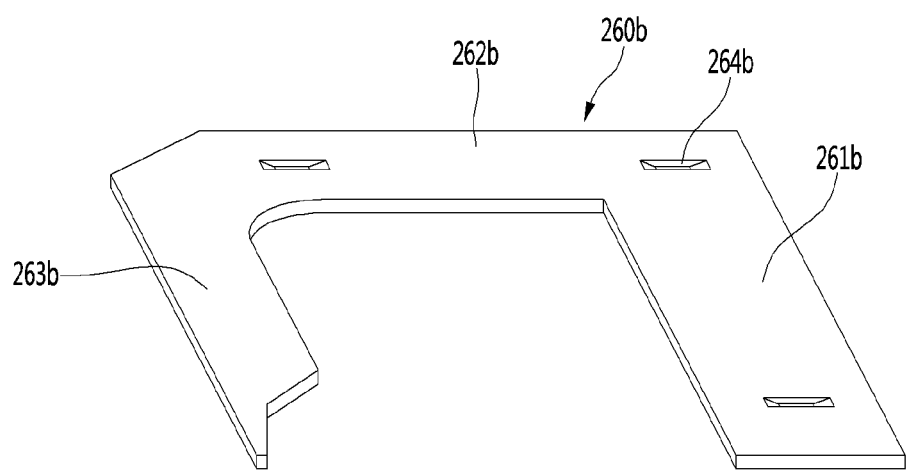
FIG. 10 is a perspective view showing the configuration of a second sheet according to an embodiment of the present disclosure.

FIG. 8 is a perspective view showing a stacked body of sheets constituting first and second core blocks according to an embodiment of the present disclosure, FIG. 9 is a perspective view showing the configuration of a first sheet according to an embodiment of the present disclosure, and FIG. 10 is a perspective view showing the configuration of a second sheet according to an embodiment of the present disclosure.

Referring to FIG. 8, the first core block 230 and the second core block 235 according to an embodiment of the present disclosure can be circumferentially combined. Further, the first core block 230 and the second core block 235 each may be configured by staking thin plate-shaped sheets 260.

In the first core block 230, several sheets 2601, 2602, and 2603 are circumferentially stacked. Although only three sheets are given reference numerals, more sheets may be stacked. Similarly, in the second core block 235, several sheets 2601, 2602, and 2603 are circumferentially stacked. Further, the first and second core blocks 230 and 235 are combined and the first coupling surface 251 may be formed at the boundary.

Each sheet 260 may have a first sheet part 261 forming a portion of the first part 201 of the core block assembly, a second sheet part 262 bending from the first sheet part 261 and forming a portion of the second part 202, and a third sheet part 263 bending from the second sheet part 262 and forming a portion of the third part 203.

In order to configure to bending inner part and outer part of the core block assembly, the several sheets 2601, 2602, and 2603 may be alternately arranged in the stacking direction.

In the configuration of the first core block 230, the outer sides of the stacked several third sheets 263 may form the third part 203a of the first core block 230 and may extend at the first set angle θ1 with respect to the third extension line $\ell 3$.

Further, in the configuration of the second core block 235, the outer sides of the stacked several third sheets 263 may form the third part 203b of the second core block 235 and may extend at the first set angle θ1 with respect to the third extension line $\ell 3$.

In the configuration of the first core block 230, the outer sides of the stacked several third sheets 261 may form the first part 201a of the first core block 230 and may extend at the second set angle θ2 with respect to the fourth extension line $\ell 4$.

Further, in the configuration of the second core block 235, the outer sides of the stacked several third sheets 261 may form the first part 201b of the second core block 235 and may extend at the second set angle θ2 with respect to the fourth extension line $\ell 4$.

For the alternate arrangement of the several sheets, a recessed coupling groove 264 is formed on a surface of the sheet 260 and a coupling portion 265 is formed on the other surface of the sheet 260. The coupling portion 265 forms the rear surface of the coupling groove 264.

The coupling portion 265 has two inclined portion 267 protruding at an angle from the sheet 260 and a plan portion 266 connecting the two inclined portions 267.

The coupling portion 265 of the most adjacently stacked sheet 260 can be inserted in the coupling groove 264 of any one sheet 260. A fifth extension line $\ell 5$ connecting the several coupling grooves 264 and coupling portion 265 arranged in the stacking direction can make the first set angle θ1 or the second set angle θ2 with respect to the third extension line $\ell 3$ or the fourth extension line $\ell 4$.

The first sheet 260a constituting the first core block 230 and the second sheet 260b constituting the second core block 235 are configured to have an entirely similar configuration, but the coupling grooves 264 and the coupling portions 265 may be formed in opposite directions.

In detail, in the first sheet 260a, the first sheet part 261a, the second sheet part 262a, and the third sheet part 263a may extend in a bending shape, and the coupling portion 265a may protrude in one direction (upward in FIG. 9).

On the other hand, in the second sheet 260b, the first sheet part 261b, the second sheet part 262b, and the third sheet part 263b may extend in a bending shape, and the coupling groove 264b may be recessed in one direction (downward in FIG. 10).

Further, when the second core block 235 is coupled to the lower portion of the first core block 230, the first and second core blocks 230 and 235 may have a symmetric shape with the first coupling surface 251 therebetween.

Further, the coupling groove 264a of the first core block 230 may be aligned to face the coupling groove 264b of the second core block 235. Accordingly, a groove portion recessed at the center portion of the coupling surface 251 may be formed at the assembly of the first and second core blocks 230 and 235. The groove portion 258 may be formed by the coupling groove 264a of the first core block 230 and the coupling groove 264b of the second core block 235.

Figure 11A:
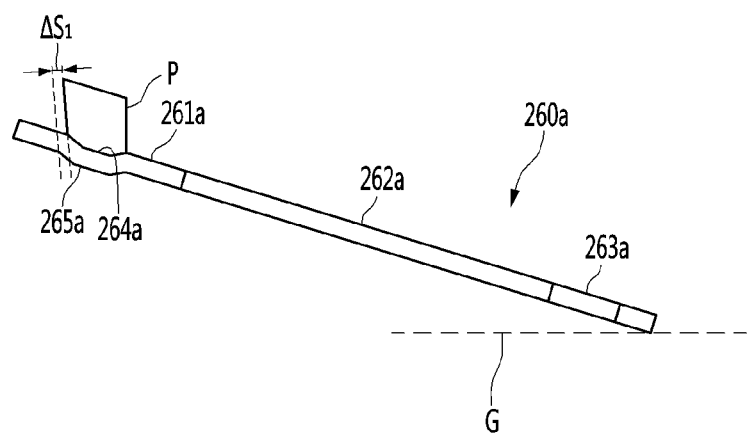
FIG. 11A is a view showing a coupling groove formed on the first sheet according to an embodiment of the present disclosure.
Figure 11B:
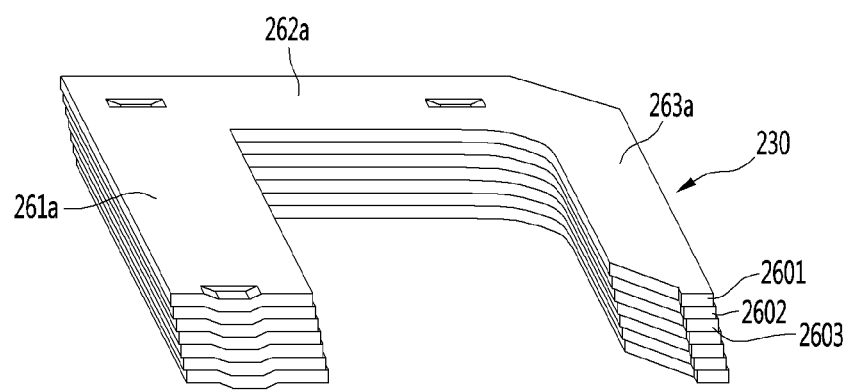
FIG. 11B is a perspective view showing a first core block configured by stacking the first sheet according to an embodiment of the present disclosure.

FIG. 11A is a view showing a coupling groove formed on the first sheet according to an embodiment of the present disclosure and FIG. 11B is a perspective view showing a first core block configured by stacking the first sheet according to an embodiment of the present disclosure.

Referring to FIGS. 11A and 11B, a process of positioning the first sheet 260a constituting the first core block 230 according to an embodiment of the present disclosure to be inclined with respect to the ground G and then machining the coupling groove 264a using an inclining press P is performed. In this process, the coupling groove 264a is formed on the pressed surface of the first sheet 260a and a coupling portion 265a is formed on the opposite surface.

Further, the surface of the coupling groove 264a and the surface of the coupling portion 265a may be shifted by a first set gap ΔS1 in the left-right direction (circumferential direction). Further, when the first sheet 260a having the shifted surfaces is stacked, a stacked body aligned at an angle can be configured. As a result, the first core block 230 constituting a portion of the V-shaped bending core block assembly can be configured.

Figure 12A:
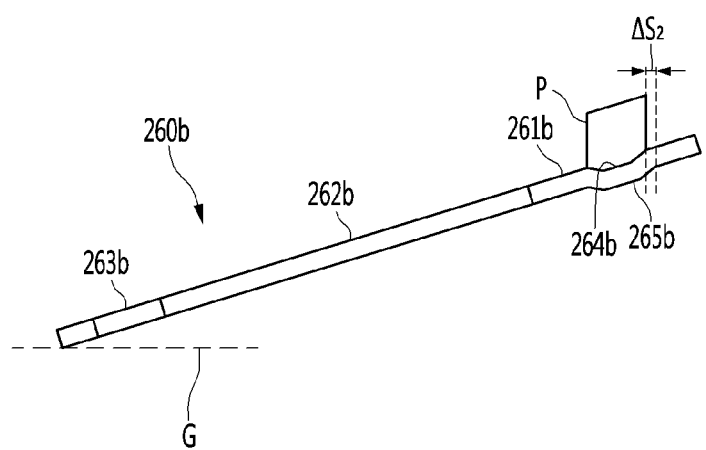
FIG. 12A is a view showing a coupling groove formed on the second sheet according to an embodiment of the present disclosure.
Figure 12B:
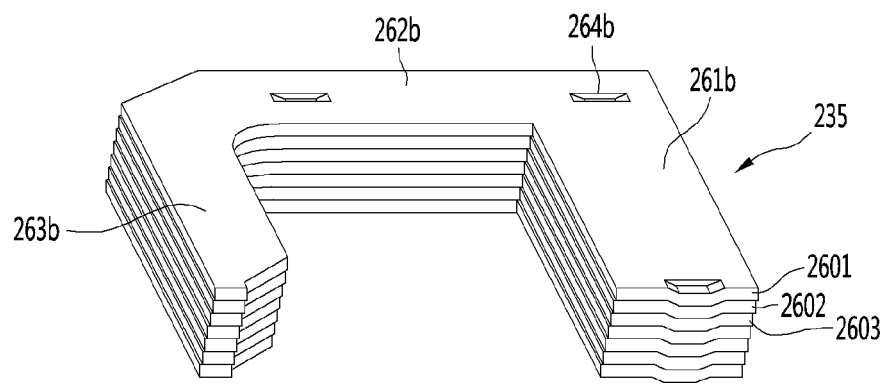
FIG. 12B is a perspective view showing a second core block configured by stacking the second sheet according to an embodiment of the present disclosure.

FIG. 12A is a view showing a coupling groove formed on the second sheet according to an embodiment of the present disclosure and FIG. 12B is a perspective view showing a second core block configured by stacking the second sheet according to an embodiment of the present disclosure.

Referring to FIGS. 12A and 12B, in the second sheet 260b constituting the second core block 235 according to an embodiment of the present disclosure, the arrangement of the coupling groove and the coupling portion may be symmetric to the first sheet 260a with the first coupling surface 251 therebetween. That is, the arrangement of the coupling groove 264b and the coupling portion 265b of the second sheet 260b may be opposite to the arrangement of the coupling groove 264a and the coupling portion 265a of the first sheet 260a.

A process of positioning the second sheet 260b to be inclined with respect to the ground and then machining the coupling groove 264b using the inclining press P is performed. In this process, the coupling groove 265a is formed on the pressed surface of the second sheet 260b and a coupling portion 265b is formed on the opposite surface.

Further, the surface of the coupling groove 264b and the surface of the coupling portion 265b may be shifted by a second set gap ΔS2 in the left-right direction (circumferential direction). Further, when the second sheet 260b having the shifted surfaces is stacked, a stacked body aligned at an angle can be configured. As a result, the second core block 235 constituting a portion of the V-shaped bending core block assembly can be configured.

In this embodiment, the second set gap ΔS2 may be the same as the first set gap ΔS1.

For the convenience of description, the coupling groove 264a and the coupling portion 265a of the first sheet 260a are referred to as a "first coupling groove" and a "first coupling portion", respectively. Further, the coupling groove 264b and the coupling portion 265b of the first sheet 260b are referred to as a "second coupling groove" and a "second coupling portion", respectively FIGS. 13A to 13C are view showing a process of installing a core block according to an embodiment of the present disclosure on a bobbin.

Figure 13A:
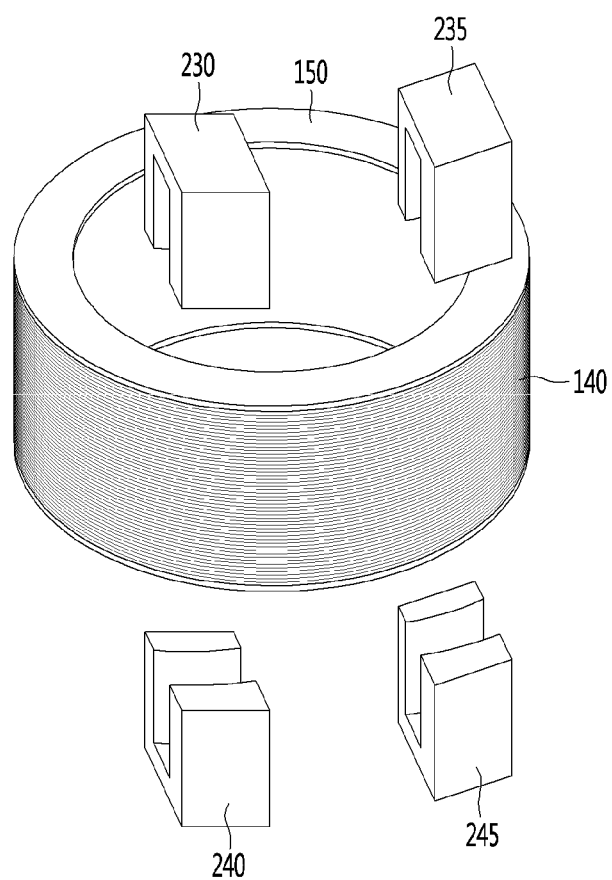
FIGS. 13A to 13C are view showing a process of installing a core block according to an embodiment of the present disclosure on a bobbin.
Figure 13B:
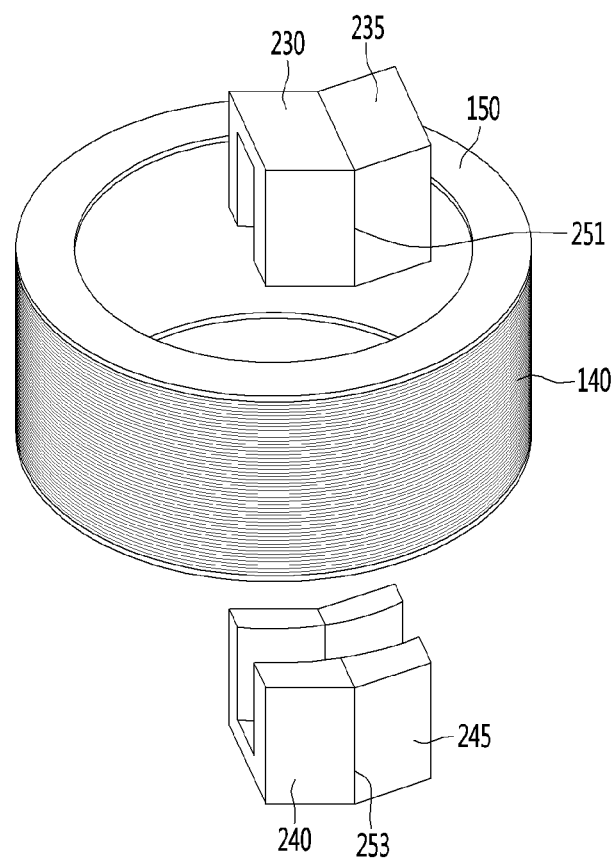
Figure 13C:
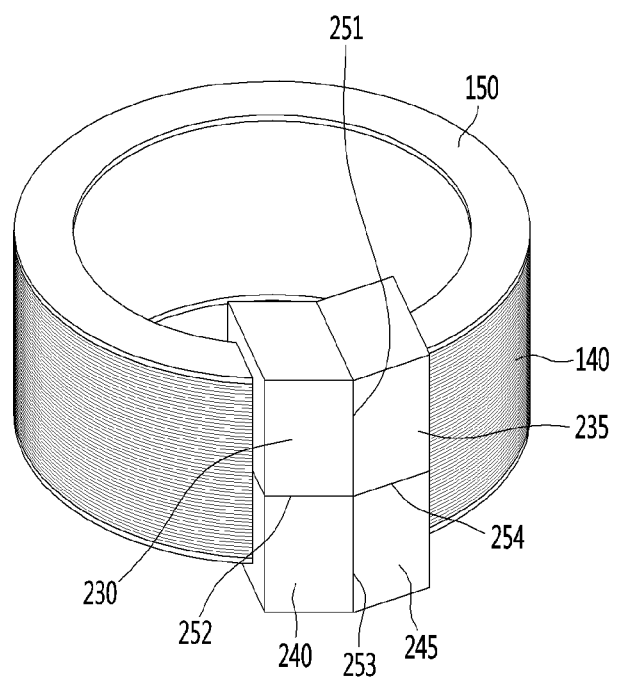

Referring to FIGS. 13A and 13B, core block assemblies may be coupled to the bobbin 150 with the coil 140 wound thereon.

First, the first core block 230 and the second core block 235 may be circumferentially combined. Further, the third core block 240 and the fourth core block 245 may be circumferentially combined. In this case, the third core block 240 may have the same shape as that of the second core block 235, and the fourth core block 245 may have the same shape as that of the first core block 230.

The first coupling surface 251 forming a boundary is formed between the first core block 230 and the second core block 235. Further, the third coupling surface 251 forming a boundary is formed between the third core block 240 and the fourth core block 245.

Further, the assembly of the first and second core blocks 230 and 235 and the assembly of the third and fourth core blocks 240 and 245 may be axially combined.

In this case, the second coupling surface 252 forming a boundary is formed between the first core block 230 and the third core block 240. Further, the fourth coupling surface 254 forming a boundary is formed between the second core block 235 and the fourth core block 245.

Figure 14A:
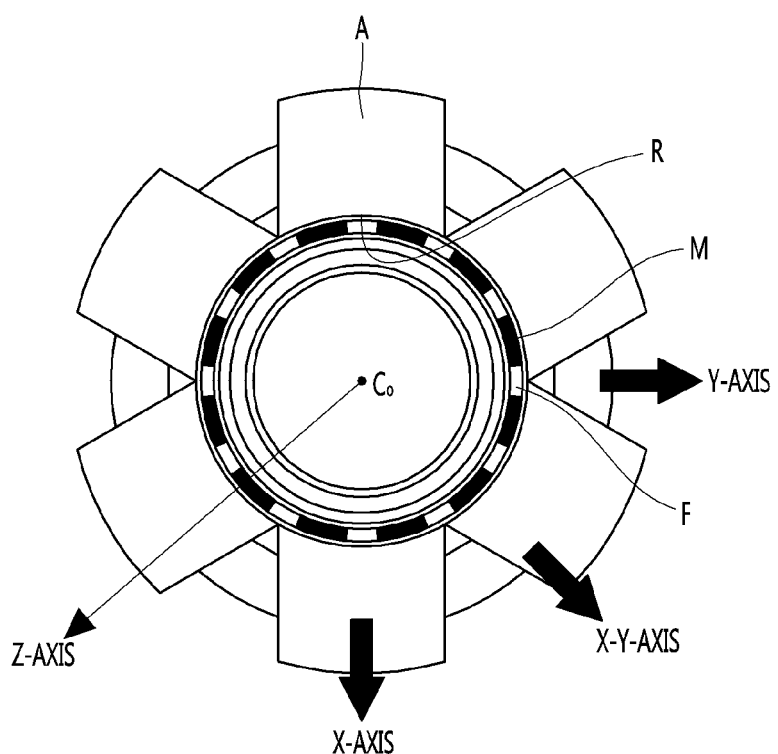
FIG. 14A is a view showing an outer core having a cylindrical shape in the related art.
Figure 14B:
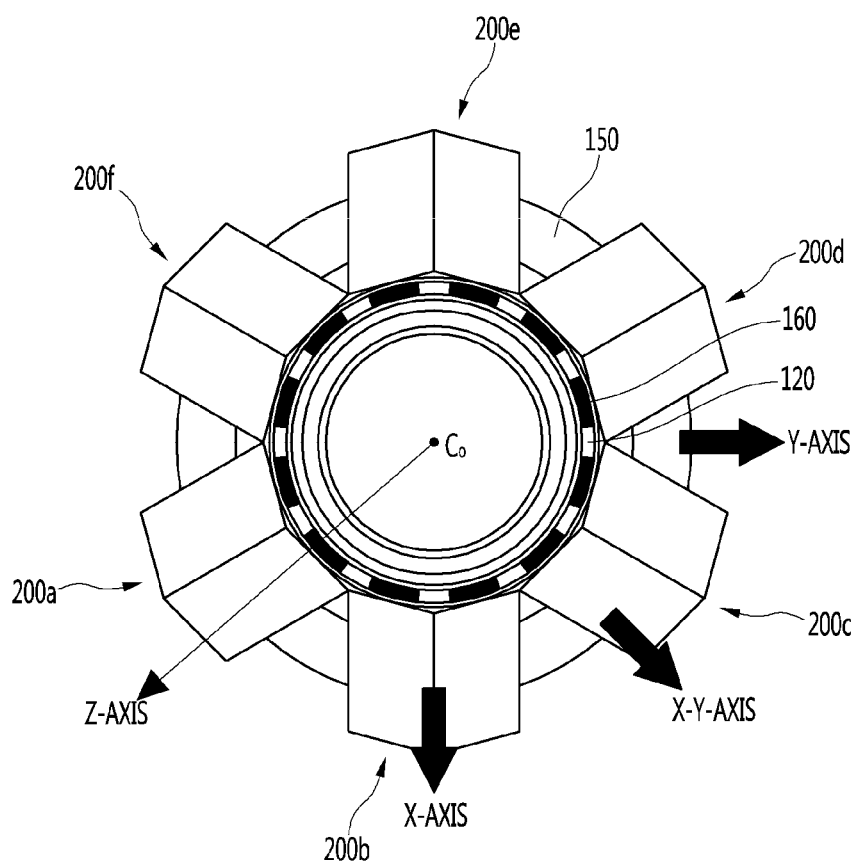
FIG. 14B is a view showing an outer core configured as a V-shaped core block assembly according to an embodiment of the present disclosure.
Figure 15:
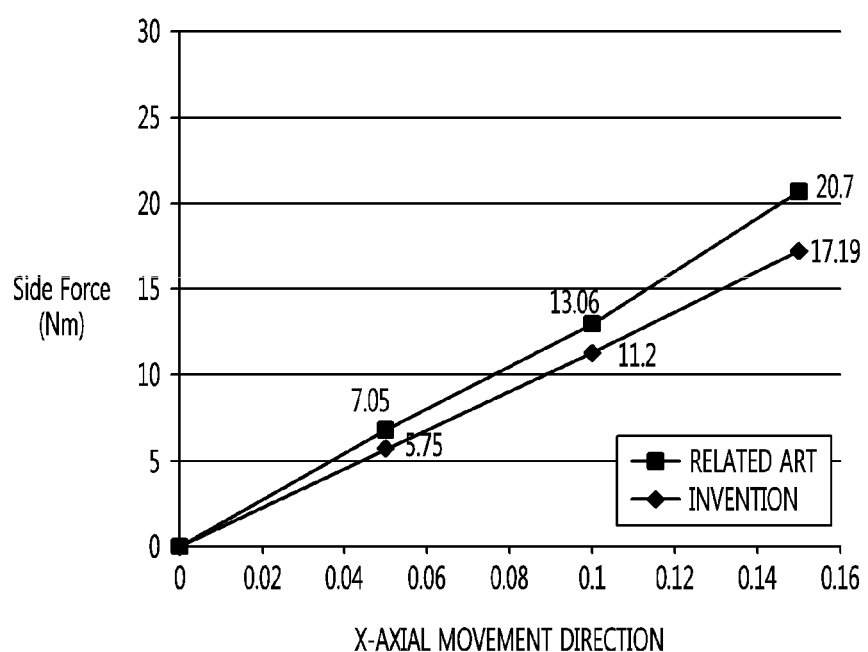
FIG. 15 is a graph showing a change of a side force that acts on an actuator when a magnet is moved in an X-axial direction in the structures of an outer core of the related art and an outer core according to the embodiment.
Figure 16:
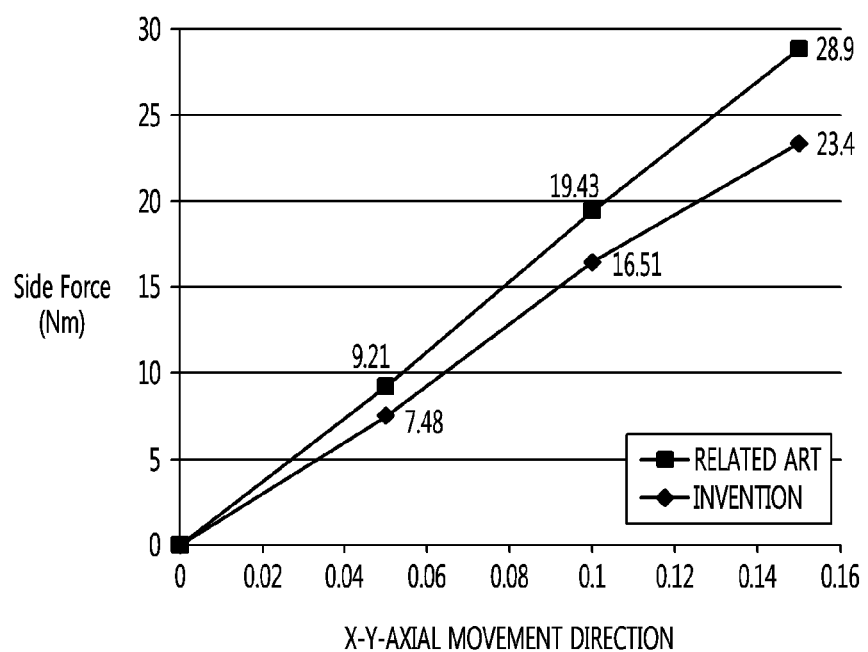
FIG. 16 is a graph showing a change of a side force that acts on an actuator when a magnet is moved in an X-Y-axial direction in the structures of an outer core of the related art and an outer core according to the embodiment.

FIG. 14A is a view showing an outer core having a cylindrical shape in the related art, FIG. 14B is a view showing an outer core configured as a V-shaped core block assembly according to an embodiment of the present disclosure, FIG. 15 is a graph showing a change of a side force that acts on an actuator when a magnet is moved in an X-axial direction in the structures of an outer core of the related art and an outer core according to the embodiment, and FIG. 16 is a graph showing a change of a side force that acts on an actuator when a magnet is moved in an X-Y-axial direction in the structures of an outer core of the related art and an outer core according to the embodiment.

In FIG. 14A, several core block assemblies A having a bending shape are circumferentially arranged to be positioned inside and outside the bobbin B as an outer core according to the related art. The inner sides of the core block assembly A form a curved portion R.

In this case, a gap between the inner sides of the core block assembly A and the magnet frame F on which the magnet M is installed is uniform.

In FIG. 14B, an outer core having several core block assemblies 200a~200f and bending in a V-shape is shown as a configuration of the present disclosure. The inner sides (vertical surfaces) of the core block assemblies 200a~200f extend at an angle with respect to the coupling surfaces of the core blocks, so gap between the inner sides of the core block assemblies 200a~200f and the magnet frame 120 on which the magnet 160 is installed circumferentially varied.

The test result shown in FIGS. 15 and 16 was deprived by performing a test on the configuration of the outer core according to FIGS. 14A and 14B.

The test condition is to determine how strong side force is applied when a piston was moved in a reciprocation direction (Z-axial direction) with a magnet moved a predetermined distance in the X-axial or X-Y-axial direction from a center C.

Referring to FIG. 15, the horizontal axis shows an eccentric distance of the magnet in the X-axial direction (hereafter, an eccentric distance) and the vertical axis shows a result value obtained by measuring a side force applied to the piston when the piston reciprocates in accordance with the eccentric distance.

In detail, the larger the eccentric distance, the larger the side force applied to the piston can be. However, comparing the inclination of the increasing side force, the inclination is relatively large in the outer core according to the related art.

For example, in the related art, when the eccentric distance is 0.05 mm, 0.1 mm, and 0.15 mm, the generated side force is 7.05 Nm, 13.06 Nm, and 20.7 Nm, respectively. On the other hand, in the present disclosure, when the eccentric distance is 0.05 mm, 0.1 mm, and 0.15 mm, the generated side force is 0.75 Nm, 11.2 Nm, and 17.19 Nm, respectively.

That is, it can be seen that the side force generated in accordance with the structure of the present disclosure decreased within a range of about 14.2% to 19.1% in comparison to the related art.

Referring to FIG. 16, the horizontal axis shows an eccentric distance of the magnet in the X-Y-axial direction and the vertical axis shows a result value obtained by measuring a side force applied to the piston when the piston reciprocates in accordance with the eccentric distance.

In detail, the larger the eccentric distance, the larger the side force applied to the piston can be. However, comparing the inclination of the increasing side force, the inclination is relatively large in the outer core according to the related art.

For example, in the related art, when the eccentric distance is 0.05 mm, 0.1 mm, and 0.15 mm, the generated side force is 9.21 Nm, 19.43 Nm, and 28.9 Nm, respectively. On the other hand, in the present disclosure, when the eccentric distance is 0.05 mm, 0.1 mm, and 0.15 mm, the generated side force is 7.48 Nm, 16.51 Nm, and 23.4 Nm, respectively.

That is, it can be seen that the side force generated in accordance with the structure of the present disclosure decreased within a range of about 15.1% to 18.8% in comparison to the related art.

As described above, in the outer core employing the core blocks being in a V-shaped according to an embodiment of the present disclosure, generation of a side force can be reduced, so the performance of the compressor can be improved.

The invention claimed is:

1. A compressor comprising:
  a cylindrical bobbin;
  a coil disposed on an outer circumferential surface of the bobbin;
  a magnet frame at least partially surrounded by the coil and configured to mount a magnet;
  an inner core at least partially surrounded by the magnet frame; and
  an outer core comprising a plurality of core block assemblies, at least a portion of the outer core being arranged at least partially around the bobbin,
  wherein each of the plurality of core block assemblies comprises a first core block and a second core block circumferentially arranged relative to the first core block and coupled to the first core block at a coupling surface between the first core block and the second core block, and
  wherein each of the plurality of core block assemblies includes an inner surface facing a central axis of the bobbin and an outer surface radially opposite to the inner surface, at least one of the inner surface or the outer surface including a first surface linearly extending in a first circumferential direction at a first angle relative to the coupling surface, and a second surface linearly extending in a second circumferential direction at a second angle relative to the coupling surface, the second circumferential direction being opposite to the first circumferential direction.

2. The compressor of claim 1, wherein the first core block and the second core block are circumferentially coupled at the coupling surface.

3. The compressor of claim 2, wherein each of the core block assemblies further comprises:
  a third core block axially coupled to the first core block; and
  a fourth core block axially coupled to the second core block.

4. The compressor of claim 3, wherein each of the core block assemblies includes:
  a first coupling surface defining a first boundary of the first and second core blocks, the first coupling surface being the coupling surface;
  a second coupling surface defining a second boundary of the first and third core blocks;
  a third coupling surface defining a third boundary of the third and fourth core blocks; and
  a fourth coupling surface defining a fourth boundary of the second and four core blocks.

5. The compressor of claim 4, wherein the first coupling surface is axially aligned with the third coupling surface, and the second coupling surface is circumferentially aligned with the fourth coupling surface.

6. The compressor of claim 4, wherein the first and third coupling surfaces extend across the second and fourth coupling surfaces.

7. The compressor of claim 4, wherein the inner surface of each of the plurality of core block assemblies is configured to be disposed inside the bobbin, and the outer surface of each of the plurality of core block assemblies is configured to be disposed outside the bobbin, and
  wherein at least one of the inner surface or the outer surface is configured to be in a V-shape.

8. The compressor of claim 7, wherein a third angle between the inner surface and a first reference line ranges from greater than 0° to less than 90°, wherein the first reference line extends perpendicular to the first coupling surface or the third coupling surface and through a first reference point that lies on the first coupling surface or the third coupling surface,
  wherein the third angle includes at least one of the first angle or the second angle.

9. The compressor of claim 7, wherein a fourth angle between the outer surface and a second reference line ranges from greater than 0° to less than 90°, wherein the second reference line extends perpendicular to the first coupling surface or the third coupling surface and through a second reference point that lies on the first coupling surface or the third coupling surface,
  wherein the fourth angle includes at least one of the first angle or the second angle.

10. The compressor of claim 7, wherein the inner surface of each of the plurality of core block assemblies is configured to be spaced apart from the magnet frame with varying distances in a circumferential direction.

11. The compressor of claim 10, wherein a first point of the inner surface and a second point of the magnet frame are defined such that a third reference line connecting the first point and the second point passes through the magnet and extends perpendicular to the magnet frame, wherein a first distance between the first point and the second point is a shortest distance between the inner surface and the magnet frame.

12. The compressor of claim 10, wherein a third point of the inner surface and a fourth point of the magnet frame are defined such that a fourth reference line connecting the third point and the fourth point passes through a space between adjacent magnets and extends perpendicular to the magnet frame, wherein a second distance between the third point and the fourth point is a longest distance between the inner surface and the magnet frame.

13. The compressor of claim 1, wherein the first core block and the second core block comprise a plurality of sheets circumferentially stacked.

14. The compressor of claim 13, wherein each of the plurality of sheets comprises:
a first sheet portion providing the outer surface;
a second sheet portion connected to the first sheet portion; and
a third sheet portion connected to the second sheet portion and providing the inner surface.

15. The compressor of claim 14, wherein at least one of the first, second, or third sheet portions comprises:
a coupling groove recessed from a first surface of the sheet; and
a coupling portion protruding from a second surface of the sheet opposite to the first surface of the sheet.

16. The compressor of claim 15, wherein the coupling groove and the coupling portion are offset by a predetermined gap along a circumferential direction,
wherein the coupling portion of a sheet is configured to be engaged with the coupling recess of an adjacent sheet such that, when stacked, the plurality of sheets is arranged at an angle along the circumferential direction, and
wherein at least one of the first core block or the second core block includes the plurality of sheets being stacked.

17. The compressor of claim 15, wherein the first core block is configured symmetrically to the second core block with the coupling surface therebetween.

18. The compressor of claim 17, wherein the coupling groove of the first core block is configured to face the coupling groove of the second core block, and
wherein each of the plurality of core block assemblies includes a groove portion recessed at a center portion of the coupling surface, the groove portion including the coupling groove of the first core block and the coupling groove of the second core block.

19. A compressor comprising:
a bobbin on which a coil is wound;
a magnet frame at least partially surrounded by the coil and configured to mount a magnet;
an inner core at least partially surrounded by the magnet frame; and
an outer core comprising first and second core blocks circumferentially coupled, at least a portion of the outer core being arranged at least partially around the bobbin,
wherein the first core block and the second core block each comprise sheets circumferentially stacked, and
wherein the sheets each comprise:
a first sheet portion providing an outer part of the first and second core blocks;
a second sheet portion connected to the first sheet portion; and
a third sheet portion connected to the second sheet portion and providing an inner part of the first and second core blocks.

20. The compressor of claim 19, wherein the outer core further comprises:
a third core block axially coupled to the first core block; and
a fourth core block axially coupled to the second core block.

* * * * *